United States Patent Office 3,817,893
Patented June 18, 1974

3,817,893
THERMOPLASTIC ELASTOMERIC COMPOSITIONS
Edward Karcher Gladding, Wilmington, Del., assignor to E. I. du Pont de Nemours and Company, Wilmington, Del.
No Drawing. Filed Dec. 22, 1972, Ser. No. 317,378
Int. Cl. C08f 45/52, 45/28
U.S. Cl. 260—28.5 AV                8 Claims

ABSTRACT OF THE DISCLOSURE

Disclosed herein are thermoplastic elastomeric compositions comprising (a) ethylene-vinyl acetate copolymer containing about 33% to 50% by weight or vinyl acetate, (b) about 10 to 50 parts per 100 parts of (a) of mineral oil and (c) up to about 15 parts per 100 parts of (a) of a low-melting wax. The compositions are readily deformable with loss of elasticity in the temperature range of about 45° C. to 85° C., regaining dimensional stability and elasticity below about 45° C. These compositions are useful *inter alia*, in fabricating custom-fitted earplugs.

BACKGROUND OF THE INVENTION

Field of the Invention

This invention relates to compositions of ethylene-vinyl acetate thermoplastic elastomers in combination with mineral oil and wax.

Description of the Prior Art

Nothing is known in the art which has the particular properties characteristic of the novel thermoplastic elastomeric compositions of this invention. For instance, the compositions contain no volatile solvents which must be removed by evaporation nor do they contain any curing agent on which they are dependent for the development of dimensional stability. They provide easy fabrication of custom-fitted earplugs which are comfortable to wear and which can be handled repeatedly without distorting the molded shape. They have tackiness for proper seal (in earplug utility) and retain tackiness over continued use. Finally, since the compositions are prepared from ethylene-vinyl acetate resins which are covered by FDA (Food and Drug Administration) regulations and mineral oils and waxes which meet the purity requirements of U.S.P. (United States Pharmacopoeia), they are safe for use in contact with human skin.

SUMMARY AND DETAILS OF THE INVENTION

The novel thermoplastic elastomer compositions of this invention comprise (a) ethylene-vinyl acetate copolymer wherein the vinyl acetate content is from about 33% to 50% by weight, and the melt index is from about 15 to 150,
(b) from about 10 parts to 50 parts per 100 parts of (a) of mineral oil, and
(c) up to about 15 parts per 100 parts of (a) of a wax whose melting point is in the range of about 40° C. to 80° C., said composition characterized by being deformable and losing elasticity at a temperature of about 45° C. to 85° C., and regaining elasticity and dimensional stability at a temperature from body temperature up to about 44° C.

The compositions at 25° C. will have Shore A Hardness in the range of about 15 to 35. Shore A Hardness is a measure of indentation hardness of the resin composition and is determined by ASTM Method D–2240. Compositions having the disclosed Shore A Hardness values will be sufficiently soft so that earplugs fashioned therefrom will be comfortable in use.

The compositions of the invention can be prepared in any convenient way. Ethylene-vinyl acetate copolymer, mineral oil and wax may be combined and kneaded such as with ink or rubber mills at 45° to 100° C. until uniform distribution of the components is obtained, or, the mixture may be dissolved in a solvent such as toluene, xylene, benzene, trichloroethylene, tetrahydrofuran, methylethylketone and the like, and the solvent subsequently removed, for example, by evaporation or distillation.

Ethylene-vinyl acetate copolymers containing from about 33% to 50% by weight of vinyl acetate and having a melt index in the range of from about 15 to 150 are available commercially or can be readily prepared by well-known art procedures. The vinyl acetate content of the copolymer should be at least about 33% by weight so that the composition will be readily deformable and flowable in the temperature range of 45° C. to 85° C. Those copolymers of higher vinyl acetate content than about 50% are too soft for the composition to have sufficient dimensional stability at body temperatures. The preferred ethylene-vinyl acetate copolymers will contain from about 35% to 45% vinyl acetate, the most preferred copolymer about 39% to 42% vinyl acetate.

By "melt-index" is meant the rate of extrusion of molten resin copolymer through an orifice of a specified length and diameter under prescribed conditions of temperature and pressure. In the context of the present specification and claims, the "melt-index" is as determined by ASTM Method D–1238. The melt-index is expressed in terms of grams per 10 minutes. Melt-index is an inverse function of the molecular weight of the copolymer, i.e. for a given copolymer composition, the higher the melt-index the lower is the molecular weight of the copolymer.

Melt-index lower than about 15 is too hard and provides compositions which are too resistant to flow in the temperature range of 45° C. to 85° C., whereas those copolymers having a melt-index higher than about 150 are too soft and provide compositions of insufficient viscosity for easy handling. The preferred ethylene-vinyl acetate copolymers have melt-indices in the range of from about 40 to 100 for good hardness and flow characteristics. The most preferred copolymers have melt indices in the range of about 45 to 70.

The molecular weight of the copolymer may be indicated by inherent viscosity as determined with 0.25% by weight solution of the copolymer in toluene at 30° C. The melt-index range of 15 to 150 for the copolymers useful in the compositions of the invention corresponds approximately to an inherent viscosity range of from about 0.85 to 0.60; the preferred melt-index range of 40 to 100 corresponds to an inherent viscosity range of from about 0.75 to 0.66.

The mineral oil employed herein is any mineral oil having a specific gravity of from about 0.83 to 0.91, and a flash point of at least about 80° C. for safety purposes. The mineral oils obtained from petroleum sources are useful in the present compositions. The preferred mineral oils are those generally known as medicinal oils, white mineral oils or liquid petrolatum. They are highly refined, colorless hydrocarbon oils of low volatility and cover a wide range of viscosities which meet the purity requirements of United States Pharmacopoeia (U.S.P.).

The amount of mineral oil to be used depends upon the vinyl acetate content of the copolymer, and the degree of tackiness desired in the composition. Addition of mineral oil to the resin will soften the resin and provide tackiness. The ethylene-vinyl acetate copolymers containing about 33% vinyl acetate will require about 40 to 50 parts of mineral oil per 100 parts of the copolymer while the copolymer with about 50% vinyl acetate will require about 10 to 20 parts of the mineral oil. With a preferred copolymer of, say, 40% vinyl acetate the amount of mineral oil used will be about 20 to 40 parts per 100 parts of the copolymer.

The addition of the wax to copolymer/mineral oil compositions increases hardness and decreases surface tackiness. The useful wax is that which melts in the temperature range of about 40° C. to 80° C. Any wax which meets the above requirement of the melting range may be used and includes such waxes as petroleum wax, both paraffin and micro-crystalline; mineral wax such as ceresin, montan, ozercerite; vegetable wax such as bayberry, candelilla, carnauba, Japan; animal wax such as beeswax; chinese wax spermaceti as well as any mixture of above waxes. The preferred wax is a petroleum-derived paraffin wax which is a solid crystalline mixture of $C_{20}$ to $C_{30}$ hydrocarbons which melt in the range of 45° C. to 65° C. and particularly the paraffin wax which meets the purity requirement of U.S.P.

The amount of wax to be used in the composition will depend primarily on the vinyl acetate content of the copolymer used and the degree of surface tackiness desired. When the vinyl acetate content of the copolymer is about 33% by weight, either no wax or a very small amount, say, 1 part per 100 parts of the copolymer is used. It is preferable to use a small amount of wax to keep the surface of the composition from being too sticky. When the vinyl acetate content of the copolymer is in the range of 45% to 50%, about 10 to 15 parts of wax per 100 parts of resin is used. With the most preferred ethylene-vinyl acetate copolymer containing about 39% to 42% vinyl acetate, about 2 to 15 parts of wax is desirably used.

Since petrolatum or petroleum jelly is a semi-solid product comopsed of micro-crystalline wax and heavy mineral oil (usually about 10% mineral oil), it is clear that petrolatum can also be used to provide at least a portion of the required mineral oil and the wax of the invention composition. The preferred petrolatum is white petrolatum whose specific gravity is in the range of 0.815 to 0.880 at 60° C. and whose melting range is about 38° C. to 60° C. and whose purity meets U.S.P. requirements.

It is clear from the above discussion that the amount of mineral oil and wax to be used with the ethylene-vinyl acetate copolymer will depend upon the vinyl acetate content of the copolymer within the defined melt index range and upon the desired softness and tackiness of the final composition. The amount of mineral oil and wax for the desired properties can be determined readily by anyone skilled in the art with few experiments using the above guidelines of mineral oil and wax vs. vinyl acetate content of the copolymer.

UTILITY

The preferred compositions of this invention are particularly suitable for the fabrication of custom-fitted earplugs. In the temperature range of from about 45° C. to about 85° C., the compositions are sufficiently nonviscous to flow without appreciable elastic memory such that when inserted into ear cavities they readily conform to the irregular contours thereof. Upon cooling below about 45° C., they very rapidly "freeze" into a dimensionally stable state such that the custom-molded earplugs can be easily removed and reinserted, without altering their shape. At body temperature, the compositions resist flow and are of sufficient toughness to retain their shapes upon handling but at the same time are of sufficient softness for comfort. The surface of the composition at body temperature is very slightly tacky—neither too sticky nor too dry. The tackiness property is of great importance in earplug applications since their effectiveness is highly dependent upon maintaining good seal between the earplugs and the skin.

Before insertion of the resin composition into the ear cavity, it is desirable to insert a cotton pellet or ball into the auditory canal adjacent to the ear drum. The resin composition is warmed to about 50 to 60° C. Warming can be accomplished by placing the resin composition in water at 50 to 60° C. or in an oven kept at that temperature range. After about 3 to 10 minutes the resin composition is sufficiently nonviscous and pliable so that it can be shaped readily into an approximately conical or frustum-shaped piece which is gently pressed into the ear canal. After about 5 to 20 minutes, the resin composition is sufficiently cooled and "frozen" so that the earplug may be withdrawn without any permanent distortion of the molded shape.

The amount of resin composition used will depend upon the type of earplug desired. The earplug may be such that the auditory canal and the concha of the ear are filled or such that the auditory canal and the whole pinna of the ear are filled. Since the earplug thus fabricated is soft, elastic, and conforms to the contour of the individual ear, it is worn in comfort and can be inserted and removed many times without any problem. Moreover, since the resin composition is thermoplastic, if sufficiently comfortable fit is not obtained initially, the earplug need only be rewarmed and reformed.

While the utility of the compositions of this invention has been described in terms of the specific utility of fabrication of personal earplugs, said compositions are (more generically) useful in applications calling for molded and shaped elastomeric articles. Shaped or molded articles such as flow baffles, toys, and the like, can be prepared by standard manufacturing techniques such as extrusion or injection molding.

Ethylene-vinyl acetate copolymers were prepared by mill-blending two copolymer resins, one containing 40% vinyl acetate and the other containing 45% vinyl acetate, with 10 and 20 parts per 100 parts of resin of mineral oil, respectively. The copolymer containing 40% vinyl acetate had a melt index of 55.

The samples were soft and elastomeric and when placed in water at 50° C. to 60° C. became pliable and could be molded readily by finger pressure. As demonstration of thermoplastic and elastomeric characteristics of the resin compositions, as well as moldability thereof, the warm samples were pushed into a 5/16 inch hexagonal nut and, after cooling, were pushed out to provide a plug with the intact impressions of the threads of the nut. Addition of paraffin wax (m.p. 62.5° C.), 10 to 20 parts (per 100 parts of resin) to the above compositions produced resin compositions which stiffened more rapidly upon cooling than the above samples.

EXAMPLE

This Example is meant to illustrate but not to limit this invention. Unless otherwise set out, percentages are based on total weight.

The following compositions of the invention contain mineral oil in the range of 20 to 40 parts and wax in the range of 2 to 13.5 parts per 100 parts of ethylene-vinyl acetate copolymer of 40% vinyl acetate by weight and a melt index of 55. Each of them would be satisfactory for earplug application. These compositions were pliable and readily moldable in the temperature range of 45° C. to 85° C. with very little or no elastic memory and upon cooling to 40° C. to 44° C., stiffened rapidly to soft, dimensionally stable, elastomeric compositions with a slight degree of surface tackiness. These compositions had Shore A Hardness of between 23 and 27 at 25° C.

TABLE

| | A | B | C | D | E | F | G | H | I |
|---|---|---|---|---|---|---|---|---|---|
| Copolymer | 100 | 100 | 100 | 100 | 100 | 100 | 100 | 100 | 100 |
| Mineral oil | 20 | 30 | 20 | 20 | 30 | 30 | 30 | 40 | 30 |
| Paraffin wax | 5 | 5 | | | | 2 | 2 | 2 | |
| Petrolatum (containing 10% mineral oil) | | | 5 | 10 | 5 | | 10 | | 15 |

Earplugs fashioned from compositions D and E were fitted to test subjects and found to be comfortable to the wearer and to provide good attenuation of sound.

The embodiments of the invention in which an exclusive property or privilege is claimed are defined as follows.

I claim:

1. A thermoplastic elastomer composition useful for custom-fitted earplugs comprising
   (a) ethylene-vinyl acetate copolymer wherein the vinyl acetate content is from about 33% to 50% by weight, and the melt index is from about 15 to 150,
   (b) from about 10 parts to 50 parts per 100 parts of (a) of mineral oil, and
   (c) from about 1 to 15 parts per 100 parts of (a) of a wax whose melting point is in the range of about 40° C. to 80° C.,
said composition characterized by being deformable and losing elasticity at a temperature of about 45° C. to 85° C., and regaining elasticity and dimensional stability at a temperature from body temperature up to about 44° C., and having a Shore A Hardness at 25° C. of between about 15 to 35.

2. A composition according to Claim 1, wherein the copolymer has a melt-index from about 40 to 100, and the mineral oil has a specific gravity in the range of about 0.83 to 0.91 and a flash point of at least about 80° C.

3. A composition according to Claim 2, having from about 35% to 45% vinyl acetate, by weight of the copolymer, said copolymer having a melt index between about 45 to 70.

4. A composition according to Claim 2, having from about 39% to 42% vinyl acetate by weight of the copolymer, from about 20 to 40 parts of mineral oil per 100 parts of copolymer, and from 2 to 15 parts of wax per 100 parts of copolymer.

5. A composition according to Claim 2, wherein the mineral oil is white mineral oil.

6. A composition according to Claim 2, wherein the wax is paraffin wax.

7. A composition according to Claim 2, wherein some portion of the mineral oil and wax is provided by petrolatum.

8. A composition according to Claim 7, wherein the petrolatum is white petrolatum.

References Cited

UNITED STATES PATENTS

| | | | |
|---|---|---|---|
| 3,492,258 | 1/1970 | Kermer | 260—28.5 AV |
| 3,551,371 | 12/1970 | Weindel | 260—28.5 AV |
| 3,660,334 | 5/1972 | Apikos | 260—28.5 AV |
| 3,497,375 | 2/1970 | Rundle | 260—33.6 UA |

ALLAN LIEBERMAN, Primary Examiner

S. L. FOX, Assistant Examiner

U.S. Cl. X.R.

260—33.6 UA, 33.6 AQ